Sept. 6, 1955  J. H. THORNBERY  2,717,290
THERMOELECTRICALLY POWERED CONTROL DEVICE
FOR WATER HEATERS AND THE LIKE
Filed Sept. 14, 1951  5 Sheets-Sheet 2

INVENTOR.
John H. Thornbery
BY

United States Patent Office 2,717,290
Patented Sept. 6, 1955

2,717,290

THERMOELECTRICALLY POWERED CONTROL DEVICE FOR WATER HEATERS AND THE LIKE

John H. Thornbery, Whitefish Bay, Wis., assignor to Milwaukee Gas Specialty Company, Milwaukee, Wis., a corporation of Wisconsin Application September 14, 1951, Serial No. 246,576

11 Claims. (Cl. 200—140)

This invention relates, in general, to heater control devices, and has particular relation to a thermoelectrically powered control device for water heaters and the like.

In prior water heater controls, rod and tube type thermostats have commonly been employed for controlling a valve arranged to control the fuel supply for the main burner. These rod and tube thermostats require an opening in the wall of the tank of the heater through which the thermostat may be inserted into the tank. This subjects the tank to leaks, and complicates installation and service. Moreover, in order to obtain a small operating differential with present rod and tube type thermostats, it is necessary to have a rod and tube of a length of the order of about eight inches to nine inches. Tanks having a center flue do not have sufficient space available for insertion of such a rod and tube type thermostat.

Bulb type thermostats have also been proposed for water heaters and the like, but these require a capillary tube leading from the bulb into proximity to the valve and linkage mechanism or the like for causing operation of the valve by expansion and contraction of the fluid within the bulb.

The copending application of Russell B. Matthews, Serial No. 246,464, filed September 13, 1951, provides an improved thermoelectrically powered and electromagnetically operated control device that may be readily installed without breaking through or providing an opening in the wall of the tank of the heater. This eliminates the possibility of leaks, and simplifies installation and service.

The above-mentioned copending application of Russell B. Mathews provides, more particularly, a thermoelectrically powered and electromagnetically operated control device having thermally sensitive means adapted to be held in heat conductive relation to an outer surface of an imperforate wall of the heater by the attachment of the control device to the heater. It further provides an adapter bracket structure having a length or dimension related to the thickness of the wall of the heater and adapted to be interposed between the control body and an imperforate portion of the wall of the heater, and for attachment at one end to the imperforate wall portion and, at its opposite end, to the control body. This adapter bracket structure is interchangeable with other adapter bracket structures of different lengths to adapt the bracket structure, and thereby the control device, to heater walls having different thicknesses of insulation.

One of the main objects of the present invention is to provide mechanism for automatically and yieldingly relating for different wall thicknesses the thermally sensitive means of the control device to the imperforate wall portion of the heater, and temperature adjusting means for the thermally sensitive means which will allow for movement of the thermally sensitive means which occurs during the automatic adjustment of the thermally sensitive means into the desired relation with respect to the imperforate wall portion of the heater.

Another and more particular object of the invention is to provide a bracket structure carrying the thermally sensitive means, and, more particularly, a combined thermostat and high limit switch with spring means for yieldingly urging the bracket, and thereby the thermostat and high limit switch, in a direction to force the high limit switch into intimate contact with the imperforate wall portion of the heater by the attachment of the control device to the heater.

Another object of the invention is to provide a splined adjusting shaft for adjusting the thermally sensitive means, and more particularly the thermostat for different temperatures, and which splined adjusting shaft is arranged to allow for movement of the thermally sensitive means which occurs during the automatic adjustment of the thermally sensitive means into the desired relation with respect to the imperforate wall portion of the heater.

Further objects and advantages, and various modifications and adaptations of the invention will appear from the following detailed description taken in connection with the accompanying drawings.

Figure 1:
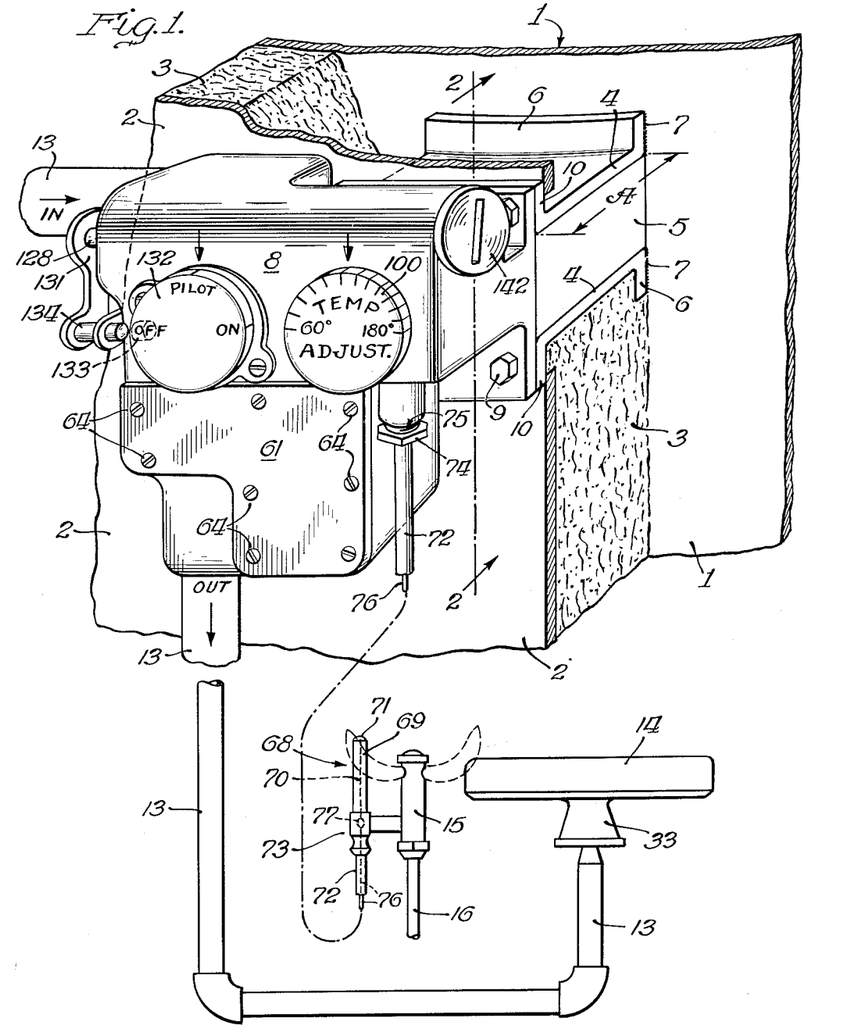
Figure 1 is a perspective view of a control device embodying the present invention as attached to an imperforate portion of the wall of a water heater which is shown fragmentarily.
Figure 5:
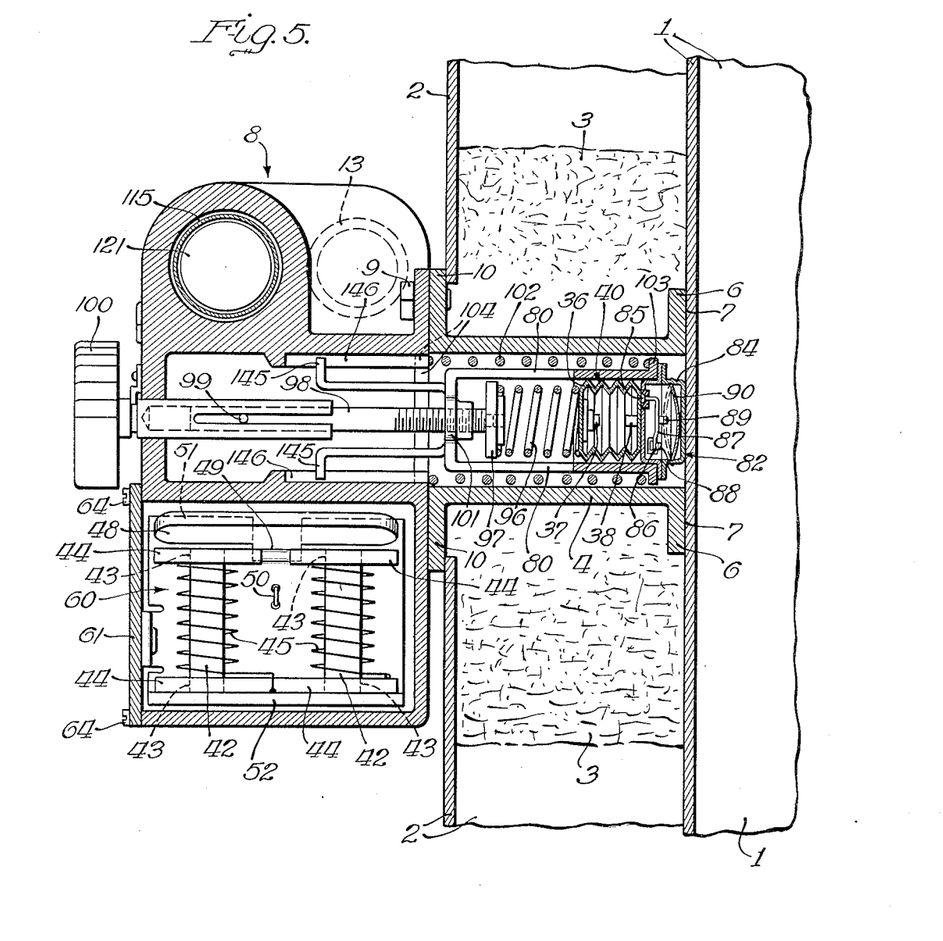
Figure 5 is a vertical sectional view taken substantially along the line 5—5 of Figure 2.

Referring now to the drawings, there is shown fragmentarily and more or less schematically in Figures 1 and 5 a wall of a water heater structure. This wall may, for example, comprise an inner metallic wall or shell 1, and an outer metallic wall or shell 2 spaced therefrom, with suitable insulation 3 filling the space between these walls, as well understood in the art.

An adaptor or mounting bracket is shown as comprising a pair of vertically spaced bracket members 4, with the space between these members closed at opposite ends by plates 5 attached, for example, by welding to the ends of the members 4. Mounting brackets of tubular or other form are contemplated within the scope of the present invention. The inner ends of the bracket members 4 have flanges 6 which, when the control device is applied to the heater, are welded, bolted, or otherwise attached at 7 to the outer surface of an imperforate portion of the wall 1 without breaking through the wall 1. The surfaces of the flanges 6 which seat against the wall 1 are preferably curved to conform to the curved contour of the wall 1 which is commonly of cylindrical form.

The main control body 8 may be in the form of a casting and of the same size for all tanks, or at least tanks of different sizes or with different wall thicknesses. The control body 8 is attached, for example, by bolts 9 to flanges 10 at the outer ends of the bracket members 4. The mounting bracket has a dimension A related as shown in the drawings to the thickness of the wall of the heater, which will vary with variations in the thickness of the insulation 3. The bracket is interchangeable with other brackets having different dimensions A related to other wall or insulation thicknesses whereby to provide adjustment or variation for different thicknesses of insulation.

The main control body 8 has a gaseous fuel inlet 11 and a gaseous fuel outlet 12. Contiguous sections of a fuel supply pipe 13 are connected to the inlet 11 and outlet 12 of the valve body. The section connected to the outlet 12 leads to the main burner 14 for the water heater. The burner 14 is shown schematically and out of relation to the fire box of the heater for facility of disclosure.

Figure 6:
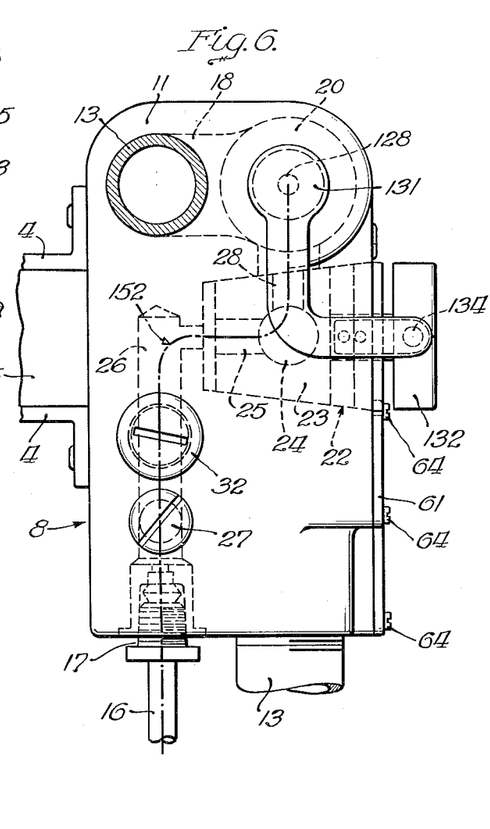
Figure 6 is an end view of the left-hand end of the device as it is shown in Figure 1.
Figure 7:
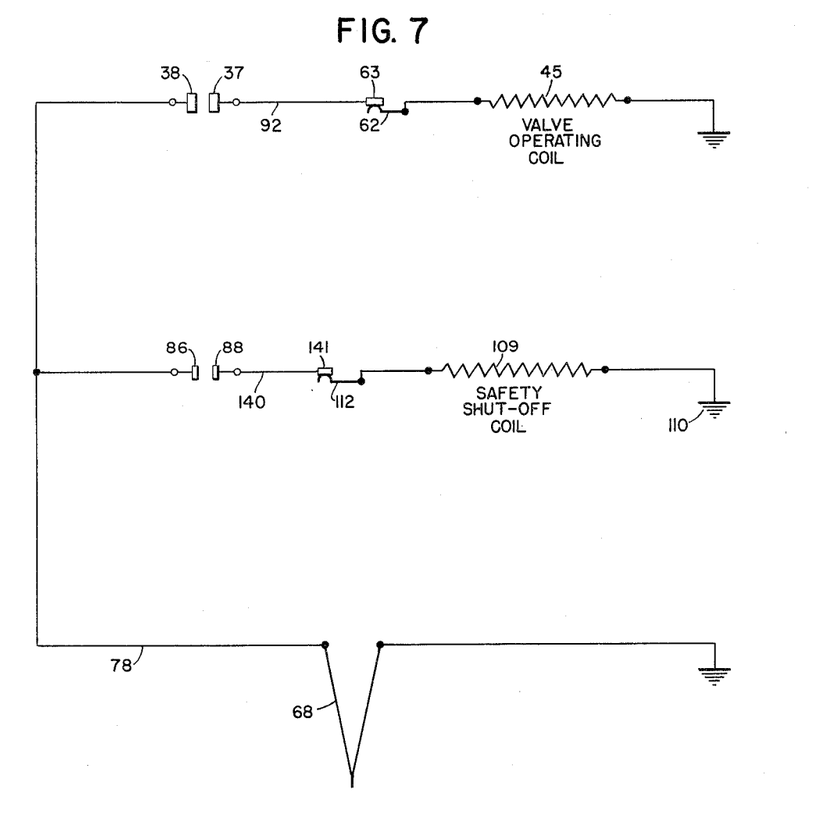
Figure 7 is an illustrative circuit diagram for the control device selected for illustration.

A pilot burner 15 is located in juxtaposition to the main burner 14 to maintain a pilot flame for igniting the burner 14. The pilot burner 15 is supplied with gaseous fuel by a pilot supply pipe 16. The pilot fuel supply pipe 16 is connected, for example, to a pilot fuel outlet 17 disposed at the bottom of the control body 8 as shown in Figure 6. The positions of the pilot burner flames are shown in dotted lines for purposes of illustration.

The fuel inlet 11 opens through a passage 18 to a valve opening 19 which opens into a chamber 20. The chamber 20 has a valve opening 21 which opens into a truncated conical bore 22 in which a truncated conical gas cock 23 is seated for turning movement. The cock or plug 23 has a passage 24 extending diametrically therethrough. An axial passage 25 leads from the passage 24 axially through the cock 23 to a passage 26 at the rear of the control body. The passage 26 leads downwardly to the pilot fuel outlet 17. A pilot burner adjusting screw 27 is adjustable in the end of the control body 8 to adjust the fuel supply for the pilot burner 15. A passage 28 opens laterally through the cock 23 from the diametrical passage 24, and, as will hereinafter appear, is adapted to register with the valve opening 21 for the supply of fuel for the pilot burner 15 when the gas cock 23 is turned to position shutting off the supply of fuel to the main burner 14.

A valve opening 29 opens from the bore 22 diametrically opposite the opening 21 into a chamber 30. The chamber 30 has a valve opening 31 which opens into the main fuel outlet 12 for delivery of gaseous fuel to the main burner 14. The passage 26 leading to the pilot fuel outlet 17 may be provided with a filter, shown diagrammatically at 32 in Figure 6, for the gaseous fuel for the pilot burner 16. The delivery of fuel from pipe 13 to the burner 14 may be through a mixing chamber 33 to which air is admitted through adjustable air inlets (not shown) for admixture with the gas, as well understood in the art.

A thermostat 40, in heat conducting relation to the water in the heater, constitutes the primary control of the device. This thermostat comprises a flexible bellows 36 filled with vapor or a volatile fluid which is adapted to expand and contract with accompanying expansion and contraction of the bellows upon changes in temperature of the water in the heater. Cooperating contacts 37 and 38 are disposed within the bellows 36 and within the vapor or fluid therein, and are arranged to be separated and engaged by expansion and contraction of the bellows. For this purpose the contact 38 may be fixed, and the contact 37 may be carried, for example, by the movable end of the bellows 36 for movement into and out of engagement with the contact 38. Bellows type thermostats of the type above described are more fully disclosed and claimed in the copending application of Philip R. Marvin, Serial No. 198,460, filed November 30, 1950.

The thermostat 40 controls the thermoelectric energization of the electromagnetic valve operator 35. The magnetic core, pole pieces, coil, and armature mounting of this valve operator is preferably of the type more fully disclosed and claimed in the copending application of Donley S. Collins, Gerald E. Dietz, and Adolph J. Hilgert, Serial No. 249,778, filed October 4, 1951.

Suffice it, for the purposes of the present application, to state that the operator 35 has a core comprising a pair of small diameter posts 42 the ends of which are expanded in openings 43 in pole pieces 44, and thereafter heat-treated, which causes a deformation and joining of the grains of metal so that the posts 42 and pole pieces 44 are practically in one piece. Where the material used for the core of the operator will permit, the posts 42 and pole pieces 44 may be formed in one piece. The operator coil 45 is wound around the posts 42 and between the pole pieces 44, and comprises as an illustrative example approximately 72 turns of No. 15 gauge copper wire having a resistance substantially equal to the resistance of the thermocouple employed for powering the device, as will presently appear.

For purposes of exemplification, an electromagnetic valve operator of the type described is adapted, when energized by a single thermocouple heated by a gas burning pilot burner under fire box conditions, to actuate to open position a valve disc for controlling the flow of gaseous fuel to the main burner. The maximum that a single thermocouple is capable of producing under such conditions is approximately 1.26 amperes at approximately 35 millivolts or thermoelectric power of the order of approximately 44 milliwatts. It is understood that other sources of energy may be available, and therefore the amperes, millivolts, and milliwatts above set forth are illustrative and not limiting. Due to the limitation of this thermoelectric energy to a relatively minute amount, and the inability to electromagnetically operate the desired valve with such energy, it has heretofore been the practice to employ a thermopile, comprising a number of thermocouples joined in series, or other means for accomplishing the desired results.

The operator 35 is provided with an armature 48 at least equal in area to the pole faces of the pole pieces 44 through which the magnetic flux path is adapted to be completed. The armature 48 is held in place on a pivot bearing 49 by a spring 50 connected between the armature arm and, for example, the upstanding arm of an L-shaped supporting bracket 51 for the relay. The base of the core of the operator 35 is attached to the horizontal arm or base 52 of the bracket, for example, by screws, bolts, or the like (not shown).

The armature arm includes a leaf spring member 54 welded or otherwise attached to the armature 48 and constituting a spring extension of the armature. This spring extension 54 is connected at 55 to a valve disc 56 to open or separate the valve disc 56 from an annular valve seat 57 surrounding the adjacent end of the valve opening 31 when the operator is thermoelectrically energized and the armature 48 moves to attracted position. Upon deenergization of the operator 35, the armature moves to retracted position and the valve disc closes against its seat 57 under the action of the spring 50 and gas pressure which holds the valve disc 56 closed against the seat 57.

In order to provide for easy removal of the electromagnetic valve operator from its chamber or compartment 60 within the control body 8, it is fastened to a cover plate 61 along with a contact spring 62 which, when the operator is in place within the control body, engages the inner end of a gas-sealed terminal 63, thereby establishing one side of a thermoelectric circuit for the coil 45. The other side of the coil 45 is grounded, for example, by screws 64 which hold the plate 61 detachably to the front of the control body 8, as shown in Figure 1. The mounting of the valve operator on the cover plate 61 may be accomplished by fastening the bracket 51 to the cover plate 61 by welding, screws, rivets, bolts, or the like.

Thermoelectric power for energizing the operator 35 and the thermoelectric safety shut-off is supplied by a single thermocouple 68. In the illustrated embodiment of the invention, the thermocouple 68 is of the general character disclosed and claimed in Oscar J. Leins Patent No. 2,126,564, patented August 9, 1938, although it may be of any other suitable form. The thermocouple 68 has an outer tubular thermocouple member 69 formed of Chromel or other suitable material, and an inner thermocouple member 70 formed of copel or other suitable material separated in the thermoelectric series from the material from which the member 69 is formed. The thermocouple members 69 and 70 are joined at 71 to form a "hot" thermojunction which, in use, is positioned to be heated by the flame of the pilot burner 15.

Figure 2:
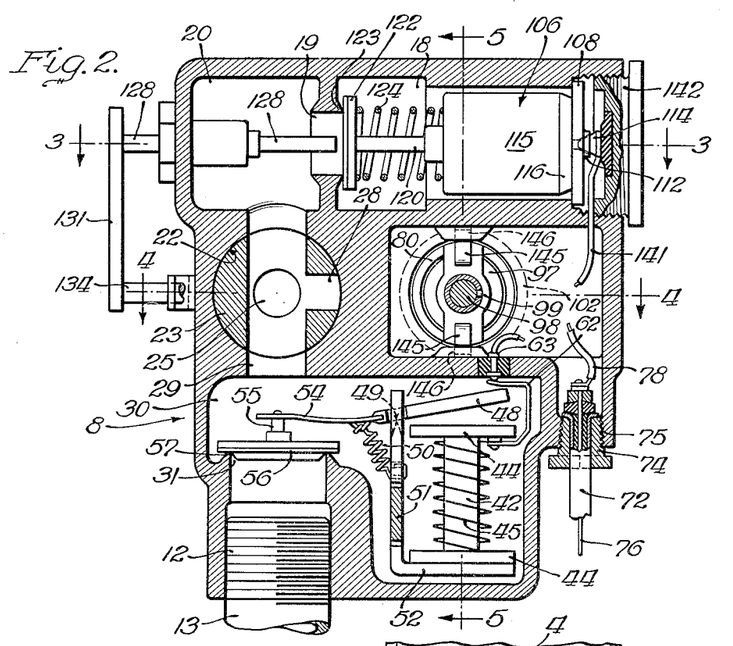
Figure 2 is a vertical sectional view taken substantially along the line 2—2 of Figure 1.

A tubular lead conductor 72 joined at 73 to the outer tubular thermocouple member has at its opposite end a couple lead attaching nut 74 which is screwed into the control body at 75, as shown in Figure 2. An inner lead conductor 76 is joined at 77 to the inner thermocouple member 70, and extends through the tubular conductor 72 and nut 74 and has an inwardly extending lead or terminal as shown at 78 in Figure 2.

The thermostat 40 is carried by a bracket 80, and the device may, if desired, be provided with a high limit switch 82 for opening or disabling the thermoelectric circuit upon the occurrence of a dangerous upper temperature limit within the heater, or when any other undesirable or dangerous or predetermined condition arises within the heater.

The high limit switch 82 may also be carried by the bracket 80, and is preferably positioned at the outer end of the thermostat 40. Thus when the control device is attached to the heater, the high limit switch 82 will be disposed between the thermostat 40 and the imperforate portion of the wall 1 and in contact or heat-conductive relation with respect to the wall 1. The limit switch thus constitutes a heat-conducting barrier between the wall 1 and the thermostat 40. Thus with a thermostat 40 having a high inherent sensitivity, such as is the case with thermostats of the vapor bellows type, the limit switch 82 will prevent too rapid burner cycling by the thermostat 40.

The high limit switch 82 comprises a metal shell 84 having an externally extending terminal 85 which enters the shell and is connected in circuit with a contact 86 carried by a spring arm 87 which biases it into engagement with a contact 88 which has a terminal extending externally of the shell 84. The spring arm 87 carries an axially disposed pin 89 which cooperates with a bimetal thermostat snap disc 90 within the shell 84. The contacts 86 and 88 are preferably gold-plated, or of other form, so as to be corrosion-resistant under the conditions of use to which the control is put.

The full line position of the bimetal snap disc 90, as shown in Figure 5, is the position in which it is disposed with the contact 86 in contact with the contact 88 when the temperature of the water in the heater is below that considered unsafe for operation. When the hot water temperature exceeds that considered safe for operation (approximately 200° F.), the thermal sensitive disc 90 snaps to its dotted line position, thus separating the contact 86 from the contact 88 through actuation of the spring arm 87 by engagement of the disc 90 with the pin 89. This preferably opens only the thermoelectric circuit for the thermoelectric safety shut-off to be presently described, the high limit switch being preferably in series with the thermoelectric safety shut-off device only in the control of the present invention.

The inwardly extending flexible lead 78 is connected in circuit with the contact 86, and also in circuit with one of the thermostat contacts 37, 38. The other of these latter contacts is connected by a flexible lead 92 to a gas-sealed terminal 63 as shown more or less diagrammatically in Fig. 4. When the electromagnetic valve operator 35 is installed in the control body 8, the contact spring 62 carried thereby contacts the inner end of the gas-sealed terminal 63. This completes the circuit from one side of the coil 45, for example, to the contact 37 of the thermostat.

The temperature adjustment means (i. e., the means for adjusting the temperature at which the contacts 37, 38 of the thermostat 40 separate) comprises a coiled spring 96, interposed between the movable end of the bellows 36 and an abutment plate 97, and a shaft 98 having splined connection at 99 with a stem 98' extending inwardly from and rotatable with a temperature selecting or adjustment knob 100. The shaft 98 is screwed through and in threaded engagement at 98" with the part 101 of the bracket 80. Rotation of the temperature selecting or adjustment knob 100 imparts, by the threaded engagement of the shaft 98 with the bracket 80 and the splined connection at 99, a component of axial movement to the shaft 98. As a result, the inner end of the shaft 98, by its cooperation with the abutment plate 97, changes the force of the spring 96 acting in opposition to expansion of the bellows 36. The thermostat 40 may thus be set to separate the contacts 37, 38 at any desired temperature.

The thermostat 40, bracket 80, high temperature switch 82, shaft 98, and the stem of the knob 100, as well as the splined connection, are readily removable as a unit from the control body 8 by merely removing the knob 100 from the outer end of its stem and removing the unit endwise from the rear of the adapter brackets 4, assuming, of course, that the bracket is not attached to the wall 1.

Figure 3:
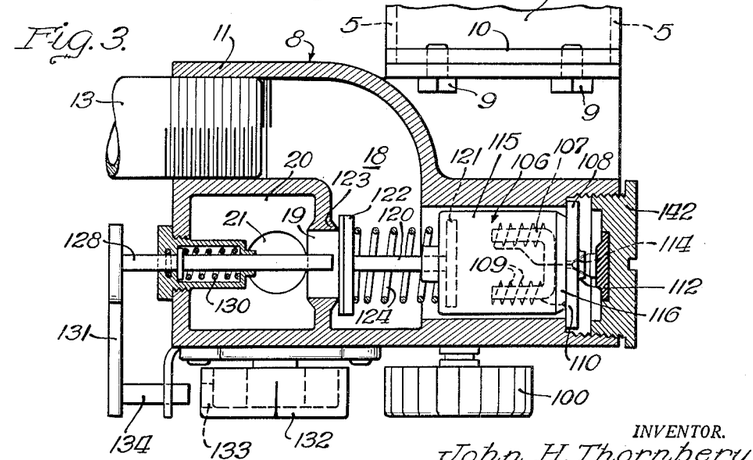
Figure 3 is a horizontal sectional view taken substantially along the line 3—3 of Figure 2.

To provide for automatic adjustment of the high limit switch 82 into intimate contact with the wall 1, notwithstanding variations in the insulation thickness of the wall of the heater and in the corresponding length or dimension A of the adapter brackets 4, a coiled spring 102 surrounds the adjacent portion of the bracket 80 and is interposed endwise between an annular flange 103 at the inner end of the bracket 80 and a shoulder 104 on the control body 8. The splined connection 99, between the shaft 98 and the stem of the knob 100, allows for movement of the high limit switch-thermostat combination which occurs during this automatic adjustment. The spring 102 presses the high limit switch 82 yieldingly into intimate contact with the wall 1 notwithstanding the above-mentioned variations in wall thickness and bracket lengths.

Where 100% fuel shut-off is desired, a thermoelectric safety shut-off device is provided as indicated, in general, at 106 in Figures 2 and 3. This device may, for example, be in the form disclosed in the copending application of Earl A. Fritz, Serial No. 186,390, filed September 23, 1950.

Suffice it for purposes of the present application to state that the device 106 comprises a generally U-shaped magnet frame 107 carried by a terminal bushing 108. A coil 109, wound around the legs of the magnet frame 107, is grounded at one end to the terminal bushing 108 at 110. The opposite end of the coil 109 is connected in circuit with an externally exposed terminal tip 112 mounted in an opening in the bushing 108 and insulated from the bushing by insulation 114. A magnet hood 115 is applied over the magnet frame 107 and coil 109, and is spun at 116 into engagement with the terminal bushing 108.

A stem 120 is mounted for reciprocatory movement through an opening in the inner end of the hood 115. An armature 121 is mounted for relative movement on the inner end of the stem 120 to permit self-accommodation to the pole faces of the magnet frame 107. A valve disc 122 is mounted for relative movement on the outer end of the stem 120 for self-accommodation to an annular valve seat 123 surrounding the adjacent end of the valve opening 19. A coiled spring 124 is interposed between the valve disc 122 and the hood 115, and moves the valve disc 122 to closed position against the valve seat 123 when the electromagnet, comprising the magnet frame 107 and the coil 109, is deenergized.

If the energization of the latter electromagnet, while sufficient to hold the armature 121 in attracted position and the valve disc 122 in open position, is insufficient to move the armature to attracted position and the valve disc to open position, a manual reset stem 128 may be provided. This stem has reciprocatory movement in the control body 8, and when pressed inwardly, engages the valve disc 122 and forces same manually to open position and the armature to attracted position. When the armature 121 is held attracted by the energization of the electromagnet which includes the coil 109 by the heat of the pilot burner flame on the thermocouple 68, the reset stem may be released and is moved outwardly to retracted position by a spring 130.

The reset stem 128 projects outwardly from the control body 8, and has a cocking or resetting button or finger piece 131. The outwardly projecting stem of the gas cock 23 has a handle 132 for turning the same. If desired, this handle may have a hole 133 which registers with a pin 134 on the button 131 only when the gas cock is in closed position shutting off the supply of fuel to the main burner. If the gas cock 23 is open, the pin 134 will abut the handle 132 and prevent resetting of the valve 122 to open position. However, when the gas cock 23 is closed, the valve 122 may be reset to open position because the pin 134 will then move into the hole 133. The gas cock 23 may, of course, have a position for shutting off the fuel supply for both the main burner and the pilot burner.

Figure 4:
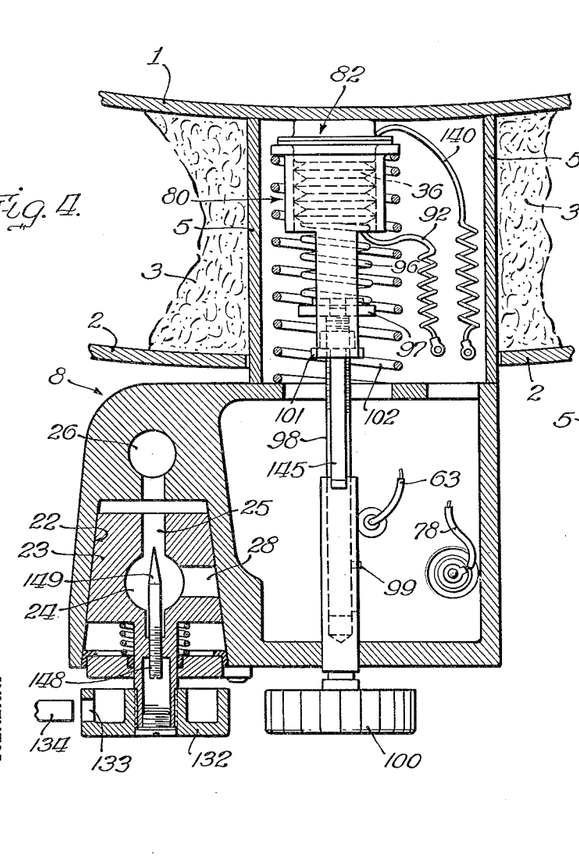
Figure 4 is a horizontal sectional view taken substantially along the line 4—4 of Figure 2.

As shown more or less diagrammatically in Figure 4, a flexible lead conductor 140 leads from the contact 88 of the high limit switch to a gas-sealed terminal 141. This terminal presses yieldingly into contact with terminal tip 112 at the adjacent end of the hood 115. A cap 142, screwed into the control body 8, has its inner end insulated and, when in place, presses the terminal into good electrical contact with the terminal tip 112. The hood 115, with its magnet frame, coil, stem, armature, and valve disc 122, is readily removable as a unit by merely unscrewing the cap 142 and removing the unit through the opening. The yielding terminal 141 is adapted to be swung downwardly out of the way to permit such removal.

A proposed modification of the present embodiment of the invention is to separate the thermostat and high limit combination from the main valve structure with a pair of electrical conductors connecting the two units. This would place the temperature control knob on the side of the tank, and the control valve could be buried in the heater compartment.

In devices not requiring 100% shut-off, the thermoelectric safety shut-off may be omitted, and there is then provided an inexpensive thermoelectrically powered control device that will turn on the main burner only when the pilot burner is ignited.

In the automatic adjustment of the high limit switch 82 into contact with the wall 1 as previously described, the bracket 89 is guided by laterally projecting guide fingers 145 on the bracket 89. These fingers 145 have sliding movement in guide grooves 146 in the control body 8.

A further adjustment for the fuel supply may be provided by an adjusting screw 148 having screwed engagement with the gas cock 23 as shown in Figure 4. The inner end of the stem of this screw may be tapered as shown at 149. By screwing the screw 148 inwardly or outwardly, the tapered end 149 decreases or increases the obstruction to the flow of gas through the gas cock 23.

The operation of the device is as follows:

The handle 132 is turned to rotate the gas cock 23 to pilot position as indicated in Figure 1. In this position the cock 23 shuts off the flow of gas to the main burner 14 and passage 28 is in register with the port 21 for the flow of gas for the pilot burner 15 when the safety shut-off valve disc 122 is opened and held open.

The hole 133 is then in register with the pin 134, thus permitting cocking the valve disc 122 to open position and armature 121 to attracted position by depressing the button 131. Gas entering at 11 then flows through port 19, through gas cock port 28, through passage 25 to the rear of the control device (gas flow shown by the dot-and-dash line 152 in Figure 6), through pilot fuel filter 32, through pilot fuel adjustment valve 27, and through outlet 17 and pipe 16 to the pilot burner. Ignition of the pilot burner 15 heats the thermocouple 68 which energizes the electromagnet comprising magnet frame 107 and coil 109. This electromagnet then retains the valve disc 122 open, and the button 131 may be released and moves to its retracted position.

The heating of the thermocouple 68 also supplies energy to thermoelectrically actuate the valve disc 56 to open position when the thermostat contacts 37 and 38 and the high limit switch contacts 86 and 88 are closed. In addition to gas pressure, a sealing force of 15 grams is applied to hold the valve disc 56 on its seat 57. As well known in the art, the pull of the armature 48 increases exponentially as it approaches the pole faces of the pole pieces 44 when the operator 35 is energized. This pull in force is stored in the flexible springs 54 until the pull of the armature 48 exceeds that of the gas pressure, plus the 15 grams sealing force, and the valve disc 56 then snaps to open position. The spring member 54 therefore allows greater movement of the armature 48 with resulting increase in valve opening and resulting greater capacity.

The gas cock 23 may then be turned to "On" position for the flow of gas to the main burner 14 which is ignited by the pilot burner. The knob 100 is turned to any desired temperature setting as indicated by the temperature markings thereon (Fig. 1). When the temperature, for example, of the water in the water heater exceeds the temperature for which the device is set, the thermostat contacts 37, 38 separate and open the circuit for the operator 35. The accompanying deenergization of the operator permits the spring 50 to actuate the armature 48 to retracted position and the valve disc 56 to closed position, thus shutting off the supply of gas to the main burner 14.

When the temperature drops and the thermostat contacts 37, 38 close, indicating the need for heat, the operator 35 is again thermoelectrically energized and operates the valve disc 56 to open position. Gas supply is thus established to the main burner 14 which is reignited by the pilot burner.

If at any time the temperature of the water exceeds that considered safe for operation, the contacts 86, 88 of the high limit switch 82 separate. This opens the circuit for the operator 35 and the valve disc 56 then closes to shut off the supply of gas to the main burner.

If at any time the flame of the pilot burner 15, which normally should burn constantly, becomes extinguished, thereby creating an unsafe condition, the thermocouple 68 will be de-energized and the flow of energizing thermoelectric current in the coil winding 109 will be discontinued. When this occurs, the spring 124 will instantly close the valve disc 122 against its seat 123. This provides 100% safety shut-off by shutting off the supply of gas both for the main burner 14 and the pilot burner 15.

When it is desired again to reset the burner and/or pilot burner in operation, the device is reset by depressing the button 131 and operating the device as previously described.

The embodiment of the invention shown in the drawings is for illustrative purposes only, and it is to be expressly understood that said drawings and the accompanying specification are not to be construed as a definition of the limits or scope of the invention, reference being had to the apended claims for that purpose.

I claim:

1. A control device for a heater having a wall comprising, in combination, a control body, a bracket carried by said control body for rectilinear movement relative thereto and projecting from said control body, temperature responsive means carried by the outer end of said bracket for movement bodily with said bracket, and a spring interposed between a shoulder on said control body and a shoulder on said bracket and biasing the outer end of said bracket yieldingly to projecting position related to the distance between said wall and said control body so as to position said temperature responsive means in heat receiving relation with respect to said wall, said temperature responsive means comprising an enclosure expansible and contractible with changes in temperature and contacts encapsulated within said enclosure for relative movement with expansion and contraction of said enclosure.

2. A control device for a heater having a wall comprising, in combination, a control body, a bracket carried by said control body for rectilinear movement relative thereto and projecting from said control body, temperature responsive means carried by the outer end of said bracket for movement bodily with said bracket, a spring interposed between a shoulder on said control body and a shoulder on said bracket and biasing the outer end of said bracket yieldingly to projecting position related to the distance between said wall and said control body so as to position said temperature responsive means in heat receiving relation with respect to said wall, said temperature responsive means comprising an enclosure expansible and contractible with changes in temperature and contacts encapsulated within said enclosure for relative movement with expansion and contraction of said enclosure, and a second condition-responsive means carried by said bracket for movement with said bracket and calibrated to respond to an extreme condition.

3. A control device for a heater having a wall comprising, in combination, a control body, a bracket carried by said control body for rectilinear movement relative thereto and projecting from said control body, temperature responsive means carried by the outer end of said bracket for movement bodily with said bracket, a spring interposed between a shoulder on said control body and a shoulder on said bracket and biasing the outer end of said bracket yieldingly to projecting position related to the distance between said wall and said control body so as to position said temperature responsive means in heat receiving relation with respect to said wall, and means for adjusting the temperature setting of said temperature responsive means, said last means including a splined connection permitting the aforesaid rectilinear movement of said bracket relative to said control body.

4. A control device for a heater having a wall comprising, in combination, a control body, a bracket carried by said control body for rectilinear movement relative thereto and projecting from said control body, temperature responsive means carried by the outer end of said bracket for movement bodily with said bracket, a spring interposed between a shoulder on said control body and a shoulder on said bracket and biasing the outer end of said bracket yieldingly to projecting position related to the distance between said wall and said control body so as to position said temperature responsive means in heat receiving relation with respect to said wall, means for preventing turning movement of said bracket relative to said control body, means including a stem having screwed engagement with said bracket for adjusting the temperature setting of said temperature responsive means, and a splined connection in said last means permitting the aforesaid rectilinear movement of said bracket relative to said control body.

5. A control device for a heater having a wall comprising, in combination, a control body, a first bracket carried by said control body for rectilinear movement relative thereto and projecting from said control body, temperature responsive means carried by the outer end of said first bracket for movement bodily with said first bracket, a spring interposed between a shoulder on said control body and a shoulder on said first bracket and biasing the outer end of said bracket yieldingly to projecting position related to the distance between said wall and said control body so as to position said temperature responsive means in heat receiving relation with respect to said wall, and second bracket means interposed between said wall and said control body and adapted for attachment at one end to said wall and at its opposite end to said control body.

6. A control device for a heater having a wall including an inner wall member and an outer wall member spaced outwardly therefrom comprising, in combination, a control body, a bracket carried by said control body for rectilinear movement relative thereto and projecting from said control body, temperature responsive means carried by the outer end of said bracket for movement bodily with said bracket, a spring interposed between a shoulder on said control body and a shoulder on said bracket and biasing the outer end of said bracket yieldingly to projecting position related to the distance between said inner wall member and said control body so as to position said temperature responsive means in heat receiving relation with respect to said inner wall member, bracket means interposed between said inner wall member and said control body and adapted for attachment at one end to said inner wall member and at its opposite end to said control body adjacent to said outer wall member, means for preventing turning movement of said bracket relative to said control body, means including a stem having screwed engagement with said bracket for adjusting the temperature setting of said temperature responsive means, and a splined connection in said last means permitting the aforesaid rectilinear movement of said bracket relative to said control body.

7. A control device for a heater having a wall including an inner wall member and an outer wall member spaced outwardly therefrom comprising, in combination, a control body, a first bracket carried by said control body for rectilinear movement relative thereto and projecting from said control body, temperature responsive means carried by the outer end of said bracket for movement bodily with said bracket, said temperature responsive means comprising an enclosure expansible and contractible with changes in temperature and contacts encapsulated within said enclosure for relative movement with expansion and contraction of said enclosure, a first spring interposed between a shoulder on said control body and a shoulder on said first bracket and biasing the outer end of said bracket yieldingly to projecting position related to the distance between said inner wall member and said control body so as to position said temperature responsive means in heat receiving relation with respect to said inner wall member, second bracket means interposed between said inner wall member and said control body and adapted for attachment at one end to said inner wall member and at its opposite end to said control body adjacent to said outer wall member, means including a first stem having an abutment at one end and screwed engagement with said first bracket for adjusting the temperature setting of said temperature responsive means, a second spring interposed between said abutment at the end of said first stem and the enclosure for said temperature responsive means for loading the same, means for preventing turning movement of said first bracket relative to said control body, and a second stem having a temperature setting knob outwardly of said control body, said second stem having splined connection with said first stem permitting the aforesaid rectilinear movement of said first bracket relative to said control body.

8. In a control device of the class described, in combination, a body member, a bracket held against turning movement and free for rectilinear movement, condition-responsive means carried by said bracket for rectilinear movement therewith, first means biasing said bracket yieldingly to projecting position, second means yieldingly loading said condition-responsive means, and adjusting means having coaction with said bracket and with said second means for adjusting the loading of said condition-responsive means.

9. A control device according to claim 8 wherein the condition-responsive means comprises an enclosure expansible and contractible with changes in a condition and contacts encapsulated within said enclosure for relative movement with expansion and contraction of said enclosure.

10. A control device according to claim 8 wherein the condition-responsive means comprises an enclosure expansible and contractible with changes in a condition and contacts encapsulated within said enclosure for relative movement with expansion and contraction of said enclosure, and second condition-responsive means carried by said bracket for movement with said bracket and calibrated to respond to an extreme condition.

11. A control device according to claim 8 wherein the condition-responsive means comprises a pair of temperature responsive devices with one disposed outwardly of the other and each having an enclosure expansible and contractible with changes in temperature and contacts encapsulated within each of said enclosures for relative movement with expansion and contraction of said enclosures.

References Cited in the file of this patent

UNITED STATES PATENTS

| Number | Name | Date |
|---|---|---|
| 804,943 | Fulton | Nov. 21, 1905 |
| 1,265,765 | Ferris | May 14, 1918 |
| 1,509,928 | Breeds | Sept. 30, 1924 |
| 1,633,908 | Schnepp | June 28, 1927 |
| 1,695,295 | Rollins | Dec. 18, 1928 |
| 1,996,907 | Drake | Apr. 9, 1935 |
| 1,997,262 | McGoldrich | Apr. 9, 1935 |
| 2,125,627 | Fonseca | Aug. 2, 1938 |
| 2,245,060 | Waddell | June 10, 1941 |
| 2,487,946 | Senn | Nov. 15, 1949 |
| 2,606,061 | Kuhn | Aug. 5, 1952 |

FOREIGN PATENTS

| 265,016 | Great Britain | Feb. 3, 1927 |